US005329613A

United States Patent [19]

Brase et al.

[11] Patent Number: 5,329,613

[45] Date of Patent: Jul. 12, 1994

[54] APPARATUS AND METHOD FOR RELATING A POINT OF SELECTION TO AN OBJECT IN A GRAPHICS DISPLAY SYSTEM

[75] Inventors: Deborah D. Brase; Steven P. Larky, both of Austin; Joe C. St. Clair, Round Rock, all of Tex.; Paolo Sidoli, Milan, Italy

[73] Assignee: International Business Machines Corporation, Armonk, N.Y.

[21] Appl. No.: 58,991

[22] Filed: May 6, 1993

Related U.S. Application Data

[63] Continuation of Ser. No. 597,956, Oct. 12, 1990.

[51] Int. Cl.[5] .................... G06F 15/62

[52] U.S. Cl. .................... 395/122; 395/121; 395/133; 395/134; 345/139

[58] Field of Search .................... 340/709, 710; 395/121, 395/122, 133, 134, 127, 157; 345/139, 156, 157

[56] References Cited

U.S. PATENT DOCUMENTS

| | | | |
|---|---|---|---|
| 4,609,917 | 9/1986 | Shen | 340/729 |
| 4,888,712 | 12/1989 | Barkans et al. | 395/134 |
| 4,941,111 | 7/1990 | Sfarti | 395/157 |
| 4,958,305 | 9/1990 | Piazza | 395/100 |
| 4,982,345 | 1/1991 | Callahan et al. | 395/155 |
| 5,027,291 | 6/1991 | Callahan et al. | 395/133 |
| 5,128,660 | 7/1992 | Demond et al. | 340/707 |

OTHER PUBLICATIONS

Foley et al, "Computer Graphics Principles & Practice", 1990, pp. 338 & 339.

James Fuller; Using Autocad; 1989; Jun. 2 to Jun. 3 "Object Selection".

*Primary Examiner*—Mark K. Zimmerman
*Assistant Examiner*—Michael S. Smith
*Attorney, Agent, or Firm*—Paul S. Drake; Casimer K. Salys

[57] ABSTRACT

Apparatus and methods for picking three dimensional objects from images depicted on a video display. The displayed objects are selectively rerendered. During such rerendering the object pixels are compared in depth to the data in a Z buffer for determining visibility. The number and size of the objects subject to rerendering by the rasterization processor is constrained by using the front end graphics processor to define object extents and by rerendering only extents which have been clipped to the boundaries of the pick window. The rerendering operation does not alter the three dimensional graphics image stored in and repetitively scanned from the frame buffer. Selection between multiple objects within the pick window can include a weighted comparison using a pick plane memory to store visibility data by object.

12 Claims, 4 Drawing Sheets

OBJECT BOUNDARY DATA MEMORY 18
FRONT END GRAPHICS PROCESSOR 1
PICK ENABLE
PICK WINDOW BOUNDARY DATA MEMORY 19
2
RASTERIZATION PROCESSOR & DISPLAY CONTROLLER
FRAME BUFFER VRAM 3
DIGITAL TO ANALOG CONVERTER 4
VIDEO OUT
WINDOW PLANE RAM 7
MASKING PLANE RAM 8
PICK PLANE RAM 20
Z BUFFER RAM 9

APPARATUS AND METHOD FOR RELATING A POINT OF SELECTION TO AN OBJECT IN A GRAPHICS DISPLAY SYSTEM

This is a continuation of application Ser. No. 07/597,956 filed Oct. 12, 1990.

BACKGROUND OF THE INVENTION

The present invention relates in general to an interface between a user of a graphics display system and the information portrayed on a video display of the system. More particularly, the invention defines apparatus and methods for selecting among visible objects displayed in a three dimensional rendering on a frame buffer based graphics video display system.

The rendering of three dimensional graphic images on a two dimensional raster scan display screen conventionally involves the use of a frame buffer to store the final image for raster display synchronized scanning. This graphics display architecture includes a number of memories which individually store window information, general masking information, and Z buffer information. A representative system is described in U.S. Pat. No. 4,609,917.

In the context of such technology, the frame buffer stores by pixel position image information which is synchronously scanned, converted and rendered on the video display. The information in the frame buffer is the end product of numerous data manipulations involving, among other things, the generation of three dimensional objects by a processor, depth comparisons referenced to a Z buffer and used to render into the frame buffer only the objects or portions thereof which are visible, clipping of the objects to windows, and clipping of the objects to general masks. Consequently, the two dimensional images resident in the frame buffer cannot in most cases be directly related back to the three dimensional objects from which they originated.

This lack of direct correspondence between the original objects and the pixel data in the frame buffer is attributable to the architecture of representative graphics systems. This architecture conventionally includes a front end graphics processor, which defines each object by boundary parameters, and a rasterization processor, which receives such object parameters and transforms those parameters into data by pixel. Thus, three dimensional objects are transformed into pixel data along raster scan referenced lines. The rasterization processor incorporates the clipping effects of window planes, the boundaries defined by masking planes, and the visibility by pixel of three dimensional objects in relation to other objects, as last defined in the Z buffer. The rasterization processor writes the pixel information into the frame buffer only after the masking conditions are satisfied and the pixel of the object subject to writing has a Z axis depth greater than the previous information at that pixel position.

This convention of three dimensional graphics display system architecture and practice makes it very difficult to perform a "pick" operation. The pick operation involves a selection, using a mouse controlled cursor or comparable pointing apparatus, by a human user of an object as visibly rendered on the video display. In such a context, the graphics display system must be able to identify which of the numerous objects rendered by the rasterization processor is the visible object portrayed on the display screen. Of course it is possible to rerender the whole image in the frame buffer and in doing so identify the correspondence of the cursor to the object. Unfortunately, that is not a practical solution in most three dimensional renderings given the extensive computational effort required to regenerate relatively complex images and the user's expectation of immediacy in the pick process.

An additional problem which exists in the contemporary practice of implementing a pick function in graphics system hardware, given the unacceptable slow speed of software implemented pick operations, is the inability of the pick hardware to discern visibility of the object as rendered into the frame buffer and depicted on the video display. Conventionally implemented pick hardware will identify position correspondence between a cursor and an object subject to rendering, but not whether that object is visible or hidden. Though new three dimensional graphics standards now specify that the pick operation should be capable of identifying the visible object at the position of the pick, an efficient implementation of such capability has yet to be defined.

Accordingly, there exists a need for graphics system apparatus and methods by which the pick operation can be implemented to identify visible objects in a three dimensional image generated on a display at a speed consistent with user expectations.

SUMMARY OF THE INVENTION

The present invention defines apparatus architecture and methods for implementing a pick function in the context of a frame buffer based graphics display system operating in conjunction with window planes, masking planes and a Z buffer to render three dimensional images. The invention is particularly suited to a graphics display architecture in which a front end graphics processor defines the objects subject to rendering using object primitives, such as triangles or rectangles, by providing information regarding the objects' vertex locations, the color parameters, and the Z-depth parameters. The information for each primitive is then manipulated in a rasterization processor to generate lines of pixel data for the frame buffer. The rasterization processor confirms that the pixel data subject to writing into the frame buffer is within a currently active window, is not subject to a masking operation, and is visible as measured by the Z-depth position previously existing in the Z buffer.

According to a preferred implementation of the invention, a front end graphics processor compares the location of the pick window to the extents of each object rendered. Objects which have extents overlapping the pick window are identified for rerendering by the rasterization processor. The extents of the objects subject to rerendering are clipped to the pick window in the front end graphics processor. The vertex parameter data for the pick window clipped object extents is conveyed to the rasterization processor for rerendering and comparison with window and masking constraints. The rasterization processor also determines visibility during such rerendering of clipped object extents, using the Z buffer to identify the foreground objects. The visibility of object's extents clipped to the pick window can be further quantified and compared on the basis of percentage or threshold standards in a refined practice of the pick operation.

These and other features of the invention will be more clearly understood and fully appreciated upon considering the detailed embodiment set forth hereinafter.

DESCRIPTION OF THE PREFERRED EMBODIMENT

Figure 1:
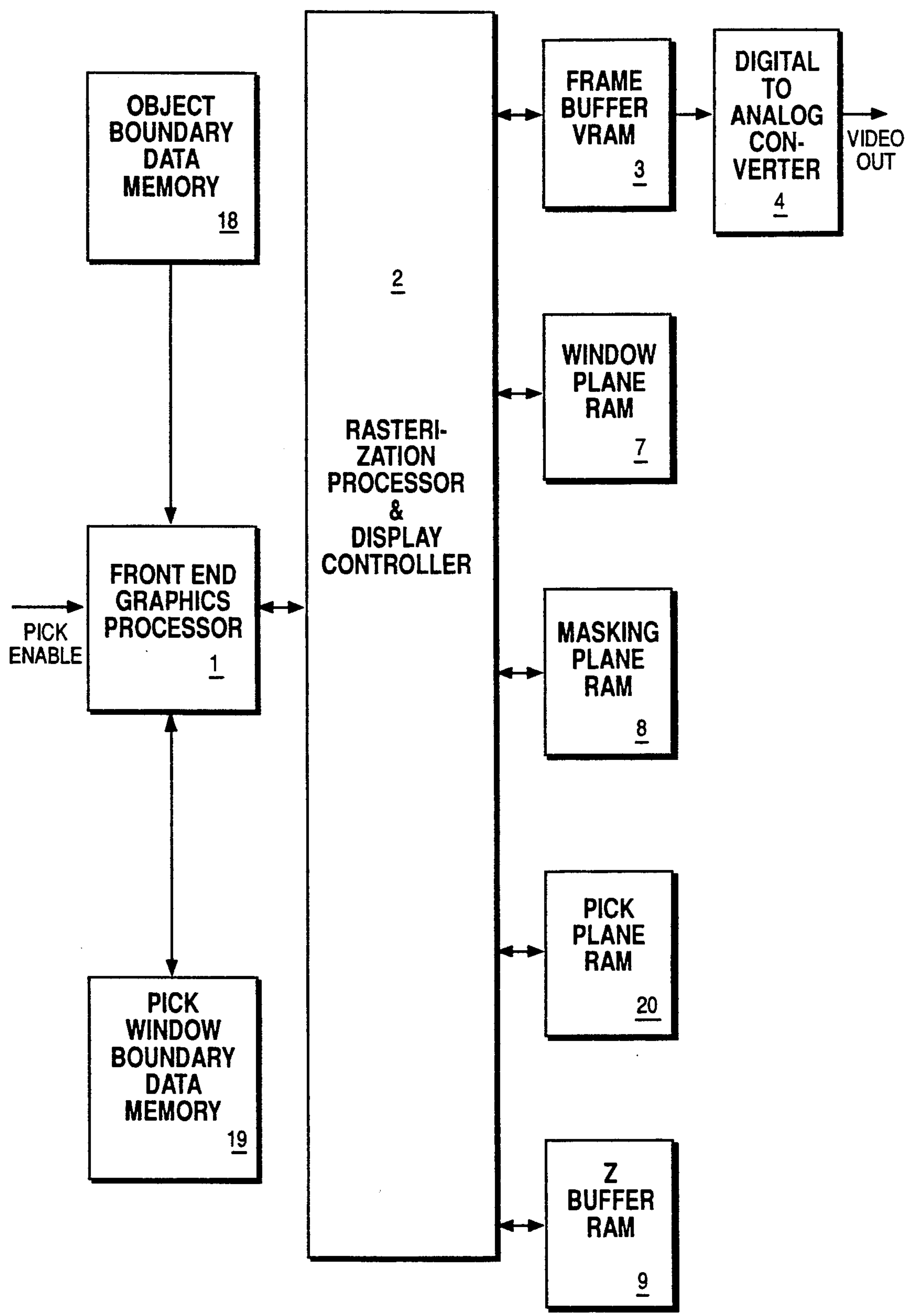
FIG. 1 is a functional block diagram of the preferred architecture for implementing a three dimensional pick operation.

FIG. 1 illustrates the functional architecture of a three dimensional graphics display control system. Front end graphics processor 1 receives requests from a high level processor for objects to be generated and then subdivides the object into polygon primitives, for example rectangles or triangles, defined by color and three dimensional position data at the vertices. Such vertex stated boundary parameter information is conveyed to rasterization processor and display controller 2 for conversion to individualized pixel data along the raster lines of the video display. The rasterized data is written into VRAM type frame buffer 3. In conventional manner frame buffer 3 is successively scanned through a serial port and converted by digital-to-analog converter 4 (commonly known as a RAMDAC) into scan synchronized RGB video color data. Frame buffer 3 stores by pixel the color data for the whole of the video display screen.

The boundary parameter information provided to rasterization processor 2 for purposes of first rendering the composite image in frame buffer 3 is normally conveyed in a succession of primitives. The visibility is unknown since it depends by pixel upon the Z depth of preceding and subsequent objects rendered into frame buffer 3. This convention for rendering images is attributable to the fact that the frame buffer is intended to store the final form of the image, which final form is affected by the location and shape of windows, the relative depth of the successive objects being rendered, such as whether they are in the foreground or the background, and other masking functions which may be applied in a global sense in the course of determining whether all or part of an object is visible. Consequently, the image in the frame buffer as visually depicted on the video display screen is the culmination of multiple object comparisons without a specific audit trail.

Figure 2:
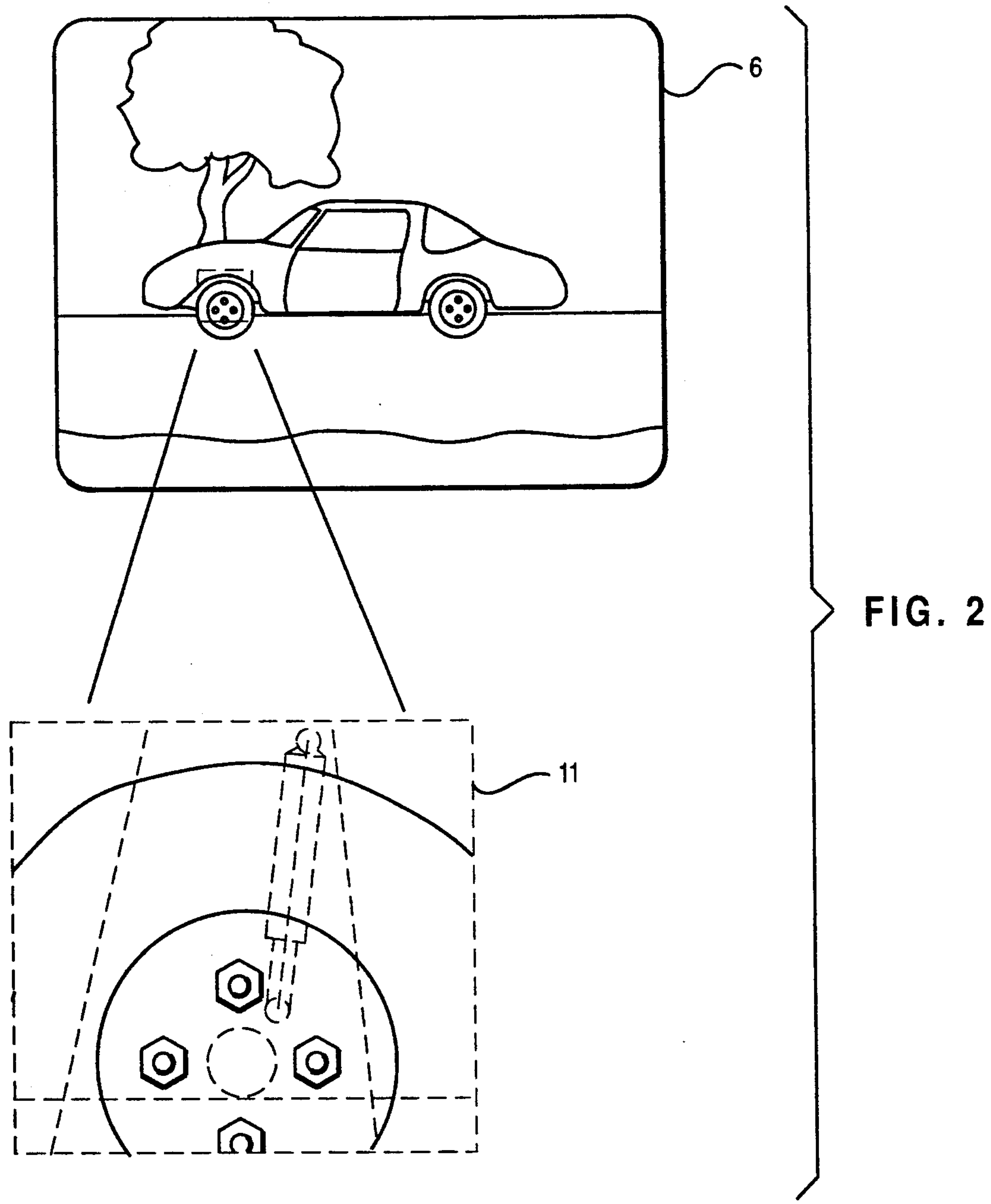
FIG. 2 is a schematic of a three dimensional image on a video display.

To appreciate the implications of the information stored in frame buffer 3, consider the generation of the simple 3-D picture in FIG. 2 as illustrated to appear on a video display screen 6. In the gross, the picture includes an automobile in the foreground, a road that extends from foreground into background, and a tree in the background. However, in the course of creating the automobile the details of the wheels and suspension may also have been subject to rendering.

The graphic object primitives which make up the various objects in the image are conveyed from front end graphics processor 1 to rasterization processor and display controller 2. Rasterization processor 2 analyzed the data representing each pixel before concluding that that data should replace that previously stored in frame buffer 3 for that pixel. Prior to rendering the image illustrated here, data has been written into RAM 7 indicating the number of the window to which each pixel is currently assigned. The comparison routinely involves a consideration of these various window planes as stored in RAM 7 to ensure that the object pixel being generated is within a visible window as then defined. Another comparison performed by rasterization processor and display controller 2 relates to the patterns in masking plane RAM 8, here practiced to ensure that some other masking function does not preclude the writing of the new pixel data into frame buffer 3. As a last element, rasterization processor and display controller 2 evaluates the Z depth of the pixel information rendered in relation to that stored in Z buffer RAM 9.

Z buffer RAM 9 stores by pixel data representing the depth of the image pixels stored in the frame buffer. The rasterization processor and display controller 2 inhibits the writing of new pixel data into frame buffer 3 unless such new data is ahead, that is, more in the foreground, than the previously stored data. From the various logical interactions performed by rasterization processor and display controller 2 in the course of rendering a pixel into frame buffer 3, one no doubt appreciates that the link between an image generated on the video display screen from data in frame buffer 3 is substantially isolated from the objects which were used to generate the image. Pick plane RAM 20 is used for rendering during pick operations, as will be explained hereinafter.

The direct rendering of video display images by software manipulation of object boundary data is not practical given the significantly slower speed of this implementation and the trend toward higher resolution graphics display systems with proportionally greater pixel counts.

The architecture in FIG. 1 can be implemented with commercially available devices. The functions required of front end graphics processor 1 can be obtained from the TMS 320C30 device manufactured by Texas Instruments. Rasterization processor and display controller 2 is representative of the functions available in the Texas Instruments TMS 34010 or the TMS 34020 devices. Frame buffer 3, window plane RAM 7, masking plane RAM 8, pick plane RAM 20, and Z buffer RAM 9 can be implemented with memory devices such as the Toshiba 524-268 device. A representative digital-to-analog converter 4 is the Brooktree BT461.

The present invention is directed toward refinements which give the graphics display system user the capability to rapidly select or "pick" objects from within a displayed composite image. The invention includes a hardware implementation of the pick function, to accentuate speed. In the representative contemporary 3-D framework of graphics video display systems, it should be apparent that the pick operation is confronted with two problems. First, there is no direct link between the image in the frame buffer and the objects which were used to generate the image. Consequently, the user's selection of a pattern by pixel location in the frame buffer is not directly relatable to the object which created the pattern. The second, and somewhat related problem, involves constraining the pick operation to a visible object as displayed on the screen. For example, in the absence of a visibility constraint a pick performed by square pick window 11 in FIG. 2 could result in the selection of the tire, which is visible and desired, or the road, or the tree, or the shock absorber or even the axle of the car. The present invention eliminates such undesired pick effects.

Figure 3:
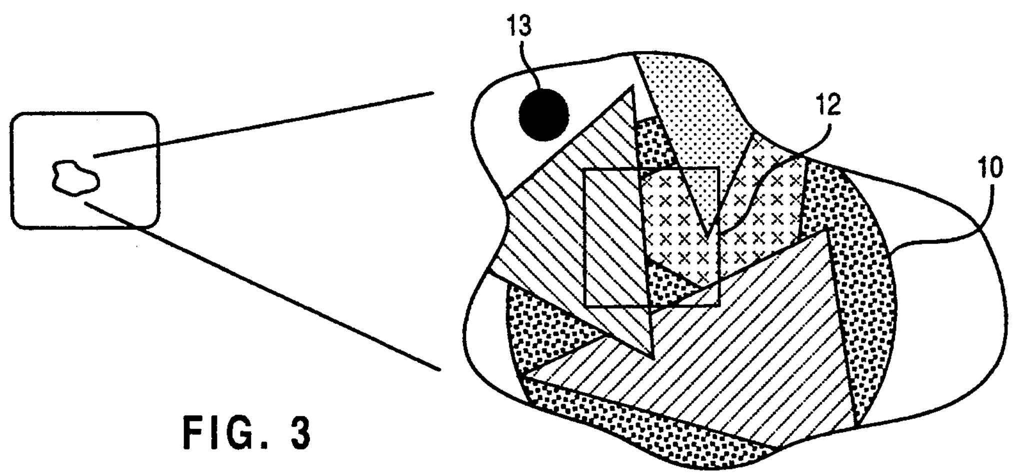
FIGS. 3 and 4 are schematics illustrate different environments for the practice of the pick function on a video display.

As a first consideration, the invention recognizes that some of the information represented by the data in frame buffer 3 will have to be regenerated in the course of identifying the object visible to the user in the pick window. The degree of regeneration and the allocation of the regeneration operations are key to the benefits of the present invention. The invention thus defines an architecture and practice by which regeneration of images is practiced only for objects which extend into the pick window. For example, FIG. 3 shows a pick window 12 situated over the combination of a large circle 10 covered by four interlaced triangular patterns. According to the invention, the objects subject to regeneration would not include those completely outside the pick window, such as small circle 13. Furthermore, though hardware implemented rasterization provides excellent speed for rerendering images, the invention also recognizes that the rerendering function may be more efficiently implemented by judiciously allocating operations between front end graphics processor 1 and rasterization processor and display controller 2. In this respect, the pick operation according to the present invention preferably involves the use of front end graphics processor 1 to clip object extents to the pick window and the use of rasterization processor 2 to rerender the object extents so clipped.

Figure 4:
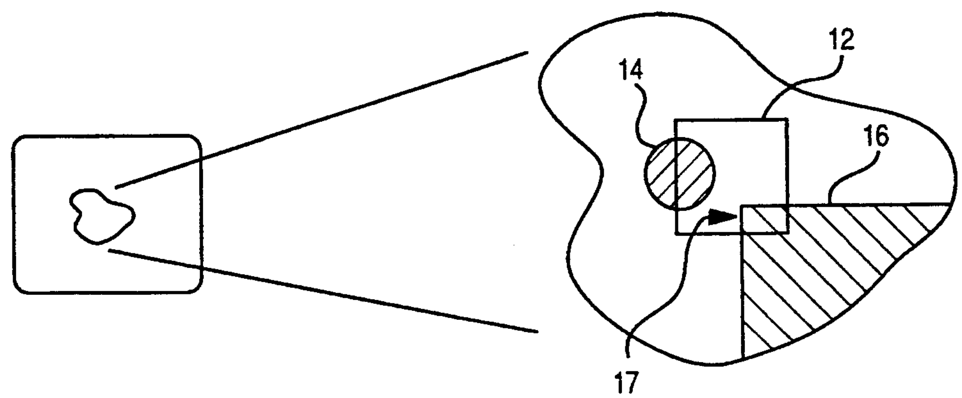

For example, pick window 12 in FIG. 4 is shown to encompass small circular object 14 as well as very large rectangular object 16. The rerendering of object 14 by rasterization processor and display controller 2 would be an acceptable practice given its size and curved shape. However, the large size of region 16 would consume significant rerendering time if fully accomplished by rasterization processor and display controller 2. It is in such context that the boundary comparison capabilities of front end graphics processor 1 are further invoked, so as to define by location and color parameters the small rectangular region 17, a union of the pick window 12 and rectangular region 16. Since boundary related manipulation of objects is the forte of front end graphics processor 1, the clipping described with reference to FIG. 4 is allocated to the front end graphics processor 1.

Given that front end graphic processor 1 operates most efficiently with rectangular objects, the invention provides for the creation of "extents". Extents are defined to be rectangular regions whose boundaries are the maximum and minimum X and Y direction values of objects. Extents are readily generated by front end graphics processor 1.

Rerendering for the pick operation is thereby efficiently implemented by having front end graphics processor 1 define the extents for all the objects and thereafter clip such extents to the boundary of the pick window. The select boundary information for the object extents so clipped is then conveyed to rasterization processor and display controller 2 for rerendering.

Rerendering of the object extents clipped to the pick window as accomplished in rasterization processor and display controller 2 does not produce a change in the content of frame buffer 3, but rather, is preferably entered as data into one or more planes of a specially designated memory, identified in the FIG. 1 as pick plane memory 20. Data is entered into the pick plane memory 20 by pixel position if and when a pixel subject to rerendering is found to have a Z value equal to that in Z buffer memory 9. The match of the Z value represents that the rerendered pixel is visible on the video display, and consequently may be part of the object sought by the human user. Upon the conclusion of the rerendering operation for each clipped object extent, the pick plane memory 20 contains a pattern of the visible pixels for the object. The patterns are preferably weighed object by object.

An even less refined version of the pick operation would merely provide an interrupt signal to the front end processor whenever a pick window clipped object subject to rerendering is found to have at least a single pixel with a Z depth that matches the related Z buffer memory data. This version does not require the pick plane memory 20. Alternatively, a flag can be set in the rasterization and display processor 2, and thereafter queried by the front end graphics processor 1 at the conclusion of each redrawn primitive or set of primitives to determine utility.

Figure 5:
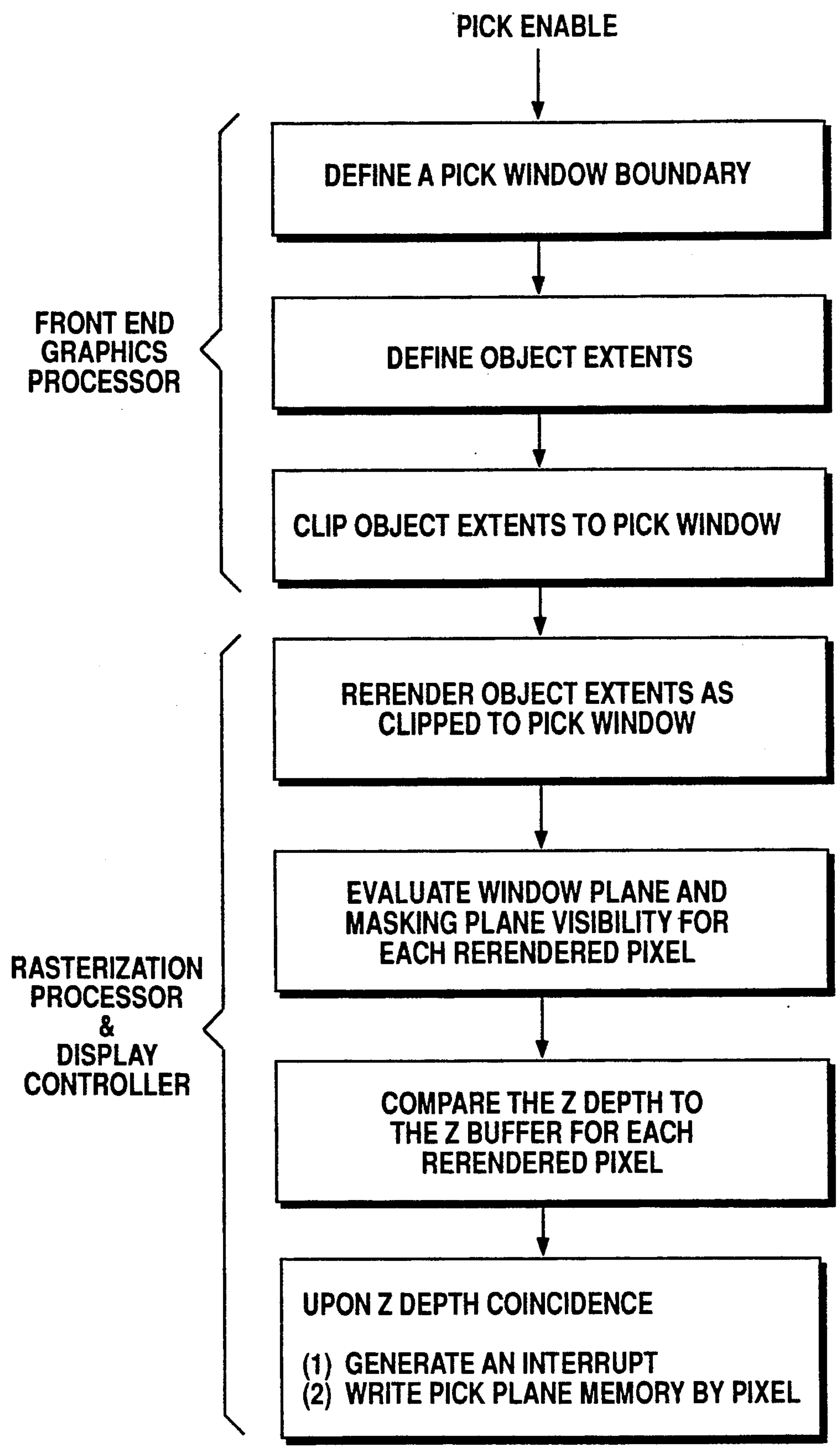
FIG. 5 is a flow diagram illustrating one practice of the pick operation.

The preferred operations performed by the devices in the functional block diagram of FIG. 1 are defined in the flow diagram of FIG. 5. Upon enabling the pick operation, front end graphics processor 1 defines the pick window boundaries and object extents using pick window boundary and object boundary data stored in memories such as represented by blocks 18 and 19 of FIG. 1. The object extents are then clipped to the pick window boundaries to determine which, if any, of the object extents must be rerendered. Each object extent clipped to the pick window is then subjected to rerendering by transmission of vertex parameter data to rasterization processor and display controller 2. In the course of rerendering each pick window clipped object extent, rasterization processor and display controller 2 evaluates the visibility of the pixel by considering the masking effects stored in window plane memory 7 and masking plane memory 8. The Z depth value of each rerendered pixel is compared to the value by corresponding pixel position as stored in Z buffer memory 9. If a Z depth match is detected, the object pixel is presumed to be visible and the potential subject of the pick operation. In the preferred practice of the invention such Z buffer coincidence initiates a write operation into the pick plane memory at a corresponding pixel location.

Figure 6:
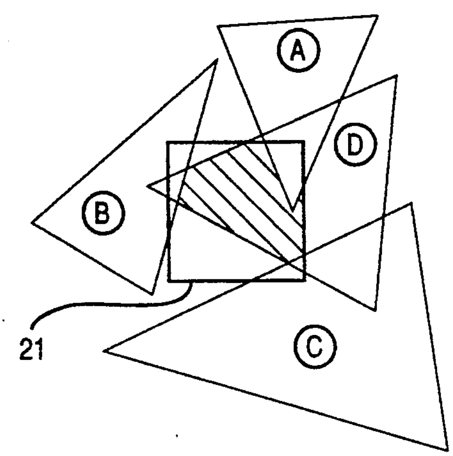
FIG. 6 is a schematic illustrating a pick window in the presence of primitives of differing depths.

The fundamental procedure is subject to numerous refinements. For instance, it was noted earlier that an interrupt can be generated upon the first occurrence of a depth match involving a rerendered clipped object extent and a Z buffer value. Once the base object is so identified, the object can be highlighted on the video display screen. Thereafter, the user can consider successive objects at discretion. Another practice of the invention involves the use of the pick plane memory as a scratch pad. According to such practice, the pattern written into the pick plane memory for each pick window clipped object extent is compared by percentage of coverage or other weighting criteria to identify the most likely candidate being sought by the user. For example, consider the pattern of triangular objects A, B, C and D in pick window 21 of FIG. 6, A being the nearest in proximity. A percentage of coverage comparison would select object D by virtue of its greater visibility, not withstanding the fact that object D may not be the first object extent subject to rerendering and may be the furthest in depth from the observer.

The architecture in FIG. 1 provides for a weighted comparison of objects in the pick window. Rasterization processor and display controller 2 rerenders each pick window clipped object extent and appropriately writes into pick plane memory 20 binary data representing by pixel the status for each pixel within the pick window. After each clipped object extent is rerendered, the pattern in the pick plane memory 20 is read by the front end graphics processor 1 and processed to obtain a weighted average of the visible pixels. This is repeated for each clipped object extent subject to rerendering, and culminates with a comparison to determine which is the most likely candidate for the pick operation. Given that a nominal size pick window can be composed of one thousand or more pixels, and that graphic system resolution continues to grow, the desirability of a weighted approach to identifying the picked objects increases with the detail of the objects being viewed.

The apparatus and operations defined herein allow the user of an advanced three dimensional graphics personal computer or workstation to practice a pick operation using a cursor defined pick window while optimally selecting visible objects in substantially real time. These features are provided in the context of a frame buffer raster scan video display, wherein the graphics images, as stored in a frame buffer and displayed to the user, include the effects of window planes, masking planes, multiple overlapping objects, and have eliminated hidden surfaces and edges. The invention appreciates and utilizes by functional allocation the individualized attributes of a front end graphics processor and a rasterization processor and display controller. Rerendering of objects by the rasterization processor and display controller to identify picked visible objects by the Z depth coincidence, is selective in two ways. First, only those objects which have extents overlapping the pick window are candidates for rerendering. And secondly, rerendering is limited to object extents which have been clipped to the boundaries of the pick window. Furthermore, the invention includes the ability to weigh the relative significance of multiple objects appearing concurrently in the pick window by using a pick plane memory for storing the outcome of Z buffer comparisons for each of the different pick window clipped rerendered object extents.

Though the invention has been described and illustrated by way of specific embodiments, the apparatus and methods should be understood to encompass the full scope of structures and practices defined by the claims set forth hereinafter.

What is claimed is:

1. In a system for rendering images composed of three dimensional objects on a video display, apparatus for picking a visible object, comprising:

- a Z buffer for storing displayed image depth data;
- means for defining a pick window with a pick window boundary;
- means for selectively rerendering each previously displayed object, including calculating object depth data, when a region encompassing and larger than said object intersects the pick window boundary; and
- means for detecting each visible object in the pick window by comparing the displayed image depth data in the Z buffer to the object depth data for each selectively rerendered object to determine whether the displayed image depth data matches the object depth data.

2. The apparatus recited in claim 1, wherein the means for detecting each visible object in a pick window, includes:

- a memory for storing image window data; and
- means for comparing the image window data to data for each selectively rerendered object.

3. The apparatus recited in claim 2, wherein said means for selectively rerendering each previously displayed object includes comparing rectangular regions encompassing each object to the pick window boundary to select an object having a rectangular region within the pick window boundary.

4. The apparatus of claim 3 wherein the means for defining a pick window includes means for defining a pick window with a pick window boundary that is smaller than the rendered image.

5. A video display system for picking visible objects from rendered three dimensional objects, comprising:

- a frame buffer for storing displayed image data of rendered three dimensional objects;
- a Z buffer memory for storing displayed image depth data of rendered three dimensional objects;
- a plane memory for storing data representing windows used in rendering the displayed image data stored in the frame buffer;
- means for storing object boundary data corresponding to each object which encompasses and is larger than each corresponding object;
- means for defining a pick window with a pick window boundary;
- a front end processor means for identifying each object which has object boundary data that intersects the pick window; and
- a rasterization processor means for rerendering each identified object to identify which rerendered objects have object depth data that matches the displayed image depth data.

6. The apparatus recited in claim 5, wherein the rasterization processor means uses Z buffer data and plane memory data to identify the visible objects.

7. The apparatus recited in claim 6, wherein the object boundary data is comprised of rectangular regions encompassing each object.

8. The apparatus recited in claim 7, wherein the rasterization processor renders the interiors of object primitives based upon object boundary data provided by the front end processor.

9. The apparatus recited in claim 8, wherein the rasterizing processor means accumulates and evaluates data by pixel to identify a visible object.

10. A process for picking a visible object from multiple three dimensional objects rendered on a graphics video display, comprising the steps of:

- defining a pick window boundary;
- identifying objects within the pick window by comparing object boundaries to pick window boundaries, each object boundary corresponding to an object wherein each object boundary encompasses and is larger than each corresponding object;
- selectively rerendering said identified objects; and
- detecting visible objects by matching the depth of the rerendered objects with the depth data for corresponding pixel positions within the pick window boundary.

11. The process recited in claim 10, wherein said step of identifying objects within the pick window is comprised of:

defining object boundary data as rectangular regions for the objects that encompass the objects; and identifying rectangular regions which overlap the pick window.

12. The process recited in claim 11, wherein said step of selectively rerendering identified objects is comprised of:

determining the region of overlap between the rectangular regions and the pick window; and selectively rerendering the regions of overlap of the identified objects.

* * * * *